United States Patent [19]

Shioya et al.

[11] Patent Number: 4,674,028

[45] Date of Patent: Jun. 16, 1987

[54] IDENTIFICATION METHOD OF A PROCESS PARAMETER

[75] Inventors: Makoto Shioya, Tokyo; Teruji Sekozawa, Kawasaki; Motohisa Funabashi, Sagamihara; Masahiro Ishida; Hiroatsu Tokuda, both of Katsuta, all of Japan

[73] Assignee: Hitachi, Ltd., Tokyo, Japan

[21] Appl. No.: 691,908

[22] Filed: Jan. 16, 1985

[30] Foreign Application Priority Data

Jan. 18, 1984 [JP] Japan .................................. 59-5575

[51] Int. Cl.⁴ ............................................. G05B 13/02
[52] U.S. Cl. .................................. 364/148; 364/157; 364/194
[58] Field of Search ................... 364/148–151, 364/155, 157–159, 160, 161, 162, 163, 194, 164, 165; 318/561

[56] References Cited

U.S. PATENT DOCUMENTS

| 4,368,510 | 1/1983 | Anderson ........................ 364/157 X |
| 4,466,054 | 8/1984 | Shigemasa et al. ............. 364/157 X |
| 4,539,633 | 9/1985 | Shigemasa et al. ............. 364/157 X |
| 4,549,123 | 10/1985 | Hagglund et al. .............. 364/162 X |
| 4,563,734 | 1/1986 | Mori et al. ........................ 364/157 |

*Primary Examiner*—Joseph Ruggiero
*Attorney, Agent, or Firm*—Antonelli, Terry & Wands

[57] ABSTRACT

A calculation unit for calculating a gain matrix from process input and output information and a calculation unit for calculating a parameter estimation have an independent weight setting unit. A weight $W_i(k+1)$ is set at a current time point while taking into consideration of an affect of square of residual $e^2(i)$ in each time step between an initial time step ($i=1$) to the current time step ($i=k+1$), and a parameter is estimated in accordance with an evaluation index $$J(k+1) = \sum_{i=1}^{k+1} W_i(k+1) \cdot e^2(i).$$

6 Claims, 1 Drawing Figure

IDENTIFICATION METHOD OF A PROCESS PARAMETER

BACKGROUND OF THE INVENTION

The present invention relates to an identification method of a process parameter, and more particularly to an identification method of a process parameter in parallel with a control for a non-linear process or a linear process in which parameters change with time.

In a prior art of identification method, a recursive exponentially weighted least square estimation algorithm ("Identification Method of a Linear Discrete Time System", SYSTEM AND CONTROL, Vol. 25, No. 8, pp 476-489, 1981) is used. It is represented as follows:

$$\hat{\theta}(k + 1) = \hat{\theta}(k) + \qquad (1)$$
$$F(k + 1)Z(k + 1)(y(k + 1) - Z^T(k + 1)\hat{\theta}(k))$$

$$F^{-1}(k + 1) = \rho F^{-1}(k) + Z(k + 1)Z^T(k + 1) \qquad (2)$$

$$F(k + 1) = \frac{F(k)}{\rho} - \frac{\frac{F(k)}{\rho} Z(k + 1)Z^T(k + 1) \frac{F(k)}{\rho}}{1 + Z^T(k + 1)\frac{F(k)}{\rho} Z(k + 1)} \qquad (3)$$

In the formulas (1)-(3), assuming that an input-output relation of a process to be identified is expressed by:

$$y(k+1) = Z^T(k+1)\theta + e(k+1) \qquad (4)$$

where y(k+1): process output (controlled variable
$\theta^T = (a_1, a_2, \ldots a_m, b_1, b_2, \ldots b_n)$: unknown parameter vector to be identified
$Z^T(k+1) = (y(k), y(k-1), \ldots y(k-m+1), u(k+1), u(k), \ldots, u(k-n+2)$: vector comprising process input and output
u(k+1): process input (manipulating variable)
e(k+1): residual (formula error)
k: k−th time step
T: symbol representing transposed matrix
then, an estimated (identified) value of an unknown parameter which minimizes an exponentially weighted sum J of squares of residuals given by the following formula is represented by $\hat{\theta}(k+1)$, where $$J(k + 1) = \sum_{i=1}^{k+1} \rho^{k-i+1}e^2(i) = \sum_{i=1}^{k+1} \rho^{k-i+1}(y(i) - Z^T(i)\theta)^2: \qquad (5)$$

exponentially weighted sum of squares of residuals $\rho$: exponential weight $(0 < \rho \leq 1)$ (6)

$$F^{-1}(k + 1) = \sum_{i=1}^{k+1} \rho^{k-i+1}Z(i)Z^T(i):$$

exponentially weighted correlation function matrix of a vector Z comprising process input and output In the above prior art method, there is no general method for determining an optimum exponential weight $\rho$, and a constant close to 1, for example, $\rho = 0.98$ is used, or the exponential weight $\rho$ which is inherently a constant is changed with time in accordance with the following function $$\rho(k+1) = (1-\lambda)\rho(k) + \lambda$$

so that it exponentially approaches 1, where $\lambda$ is sufficiently smaller than 1, for example, $\mu = 0.001$.

$\rho$ tends to exponentially reduce past contribution. When $\rho$ is smaller than 1 (where $\rho = 1$ representing present contribution), identification can be tracked more or less even if the process parameter slowly changes. However, where the parameter rapidly changes or in a non-linear process, the tracking may be delayed or an identification error is fed back to the control so that the overall control system is rendered unstable. If $\rho$ is too small, a sensitivity to a noise is too high to converge the identification.

Since $\rho$ represents the past contribution when the present contribution is represented by $\rho = 1$, coefficients $\lambda_1(k)$ and $\lambda_2(k)$ representing the past contribution and the present contribution, respectively, are introduced so that the formulas (2) and (3) are generalized as follows and combined with the formula (1). This is called a generalized adjustment law for adaptive control. ("Recent Trend in Adaptive Control", SYSTEM AND CONTROL, Vol. 25, No. 12, pp 715-726, 1981)

$$\hat{\theta}(k + 1) = \hat{\theta}(k) + \qquad (7)$$
$$F(k + 1)Z(k + 1)(y(k + 1) - Z^T(k + 1)\theta(k))$$

$$F^{-1}(k + 1) = \lambda_1(k)F^{-1}(k) + \lambda_2(k)Z(k + 1)Z^T(k + 1) \qquad (8)$$

$$F(k + 1) = \lambda_1^{-1}(k)F(k) - \qquad (9)$$

$$\frac{\lambda_2(k)\lambda_1^{-2}(k)F(k)Z(k + 1)Z^T(k + 1)F(k)}{1 + \lambda_2(k)\lambda_1^{-1}(k)Z^T(k + 1)F(k)Z(k + 1)}$$

: adaptive gain matrix

In this generalized adjustment law, there is no criterion for determining coefficients $\lambda_1(k)$ and $\lambda_2(k)$ and they are, in many cases, determined experimentarily or by experience. Thus, where the parameter rapidly changes or in the non-linear process, a variation may occur in the identification.

SUMMARY OF THE INVENTION

It is an object of the present invention to provide a stable method of identification of a process parameter where the process parameter rapidly changes with time or in a non-linear process.

In order to achieve the above object, in accordance with the present invention, an evaluation index J shown in the formula (5) is modified as follows:

$$J(k + 1) = \sum_{i=1}^{k+1} W_i(k + 1)e^2(i) = \sum_{i=1}^{k+1} W_i(k + 1)(y(i) - Z^T(i)\theta)^2: \qquad (10)$$

weighted sum of squares of residuals where $W_i(k)$: weight (11)

In estimating a parameter based on the evaluation index of the formula (10), a weight $W_1(k+1)$ can be determined at present step while taking into consideration of an influence by a square $e^2(i)$ of a residual in each time step i from the initial time step (i=1) to the present time step (i=k+1). Thus, a mechanism for determining the weight can be independent from a parameter estimation mechanism.

BRIEF DESCRIPTION OF THE DRAWINGS

The above object, features and advantages of the present invention will become apparent from the following description taken in conjunction with the accompanying drawing, in which.

DESCRIPTION OF THE PREFERRED EMBODIMENT

Figure 1:
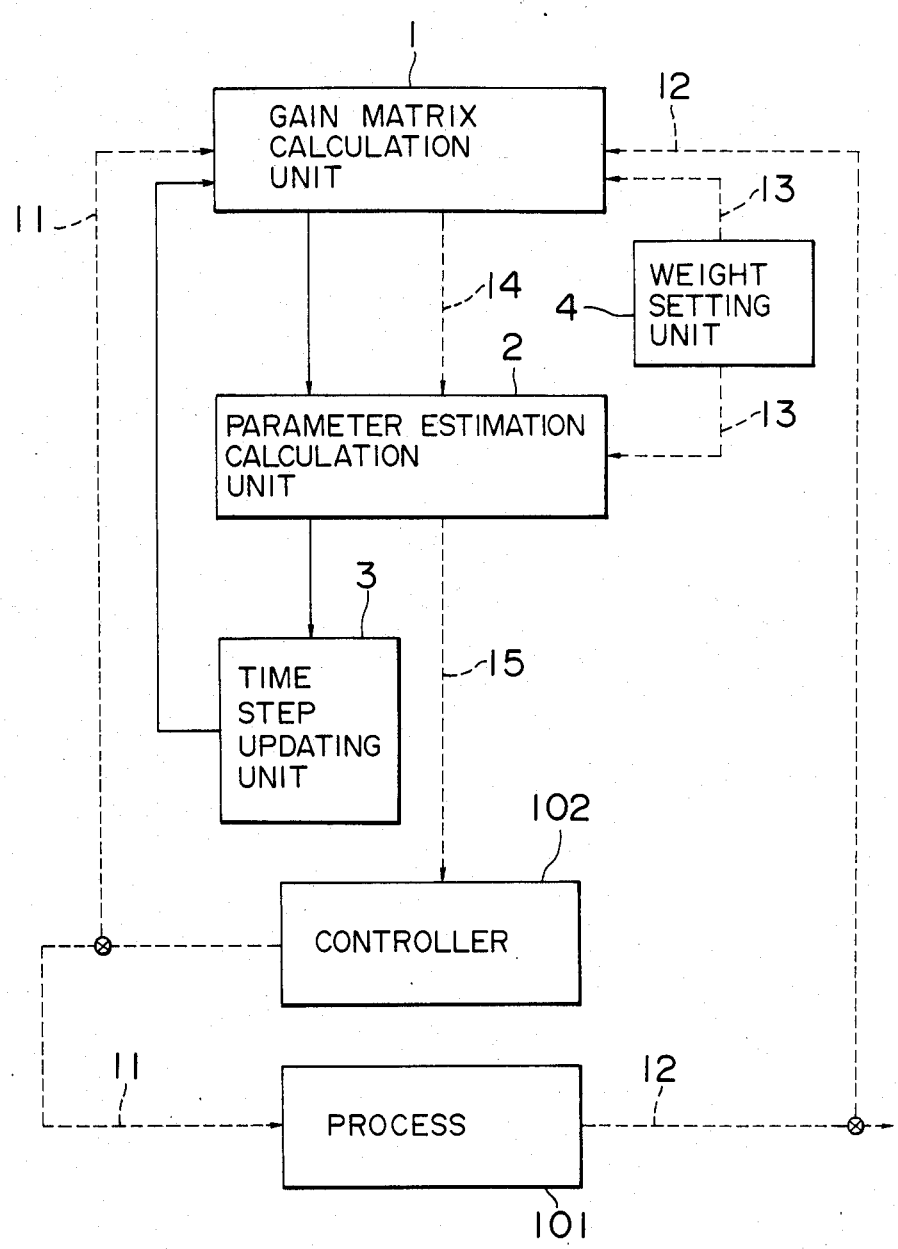
FIG. 1 is a block diagram of an embodiment of an identification method of the present invention employing a computer.

A principle of the present invention is first explained in detail.

Under the formula (10), the formulas (1), (2) and (3) are represented as follows.

$$\hat{\theta}(k+1) = F(k+1)\beta_1(k)\beta_2^{-1}(k)F^{-1}(k+1)\hat{\theta}(k) + \quad (12)$$
$$F(k+1)\alpha(k)(Z(k+1)y(k+1) -$$
$$\beta_1(k)\beta_2^{-1}(k)Z(k+1)Z^T(k+1)\hat{\theta}(k))$$

$$F^{-1}(k+1) \stackrel{d}{=} \sum_{i=1}^{k+1} W_i(k+1)Z(i)Z^T(i) \quad (13)$$
$$= \beta_2(k)F^{-1}(k) + \alpha(k)Z(k+1)Z^T(k+1)$$

$$F(k+1) = F(k)\beta_2^{-1}(k) - \quad (14)$$
$$\frac{\alpha(k)F(k)\beta_2^{-1}(k)Z(k+1)Z^T(k+1)F(k)\beta_2^{-1}(k)}{I + \alpha(k)Z^T(k+1)F(k)\beta_2^{-1}(k)Z(k+1)}$$

where $$\beta_1(k) = I + I\left(\sum_{i=1}^{k} \Delta W_i(k)Z(i)y(i)\right)(I \cdot F^{-1}(k)\hat{\theta}(k))^{-1} \quad (15)$$

$$\beta_2(k) = I + \left(\sum_{i=1}^{k} \Delta W_i(k)Z(i)Z^T(i)\right)F(k) \quad (16)$$

$$\alpha(k) = W_{k+1}(k+1) \quad (17)$$

$$\Delta W_i(k) \stackrel{d}{=} W_i(k+1) - W_i(k) \quad (18)$$
$$= \left(\frac{W_i(k+1)}{W_i(k)} - 1\right)W_i(k)$$
$$\stackrel{d}{=} C_i(k)W_i(k)$$

I: unit matrix

The formulas (12), (13) and (14) correspond to the generalized adjustment law formulas (7), (8) and (9) in the prior art, and they are adjustment laws for generally weighted cases. In the prior art method, $\lambda_1(k)$ is a scalar quantity while, in the present invention, $\beta_2(k)$ is a $(m+n)\times(m+n)$-order symmetric matrix, $\beta_1(k)$ is a $(m+n)\times(m-n)$-order diagonal matrix, and as will be described, $\beta_2(k)$ and $\beta_1(k)$ are scalar when the weight is in a specific form and they substantially correspond to the generalized adjustment law. Thus, the formulas (12), (13) and (14) may be considered as an expanded generalized adjustment law.

The fact that $\lambda_1(k)$ is scalar means that an affect raised in the time-varying parameter system or a non-linear system is averaged for each element of parameter estimated value and the average is fed back, and the fact that $\beta_2(k)$ is the matrix means the feedback in accordance with the contribution of each element, as is seen from the order of the matrix.

Since the formulas (12), (13) and (14) are of recursive type, they are suitable for on-line identification, but since they include calculation of inverse matrices $\beta_2^{-1}(k)$ and $F(k+1)$, a long calculation time is required when sizes of $\beta_2(k)$ and $F(k+1)$ are large, that is, the number of elements of Z is large. In such a case, they may not be suitable for the real-time identification.

In the formula (8), if $C_i(k)$ is a sole function of k, that is, if $$C_i(k) = C_o(k) \text{ (for all i's)} \quad (19)$$

the second terms in the right sides of the formulas (15) and (16) are represented as:

$$I\left(\sum_{i=1}^{k} \Delta W_i(k)Z(i)y(i)\right)(I \cdot F^{-1}(k)\hat{\theta}(k))^{-1} =$$
$$I\left(\sum_{i=1}^{k} C_o(k)W_i(k)Z(i)y(i)\right)\left(\sum_{i=1}^{k} W_i(k)Z(i)y(i)\right)^{-1} = C_o(k)I$$

$$\left(\sum_{i=1}^{k} \Delta W_i(k)Z(i)Z^T(i)\right)F(k) =$$
$$\left(\sum_{i=1}^{k} C_o(k)W_i(k)Z(i)Z^T(i)\right)\left(\sum_{i=1}^{k} W_i(k)Z(i)Z^T(i)\right)^{-1} = C_o(k)I$$

Accordingly, the formulas (15) and (16) are identical and represented as:

$$\beta(k)/d\beta_1(k) = \beta_2(k) = (1+C_o(k))I \quad (20)$$

and the formulas (12), (13) and (14) are represented in the following forms which include scalar parameters $\beta(k)$ and $\alpha(k)$.

$$\hat{\theta}(k+1) = \hat{\theta}(k) + \quad (21)$$
$$F(k+1)\alpha(k)Z(k+1)(y(k+1) - Z^T(k+1)\hat{\theta}(k))$$

$$F^{-1}(k+1) = \beta(k)F^{-1}(k) + \alpha(k)Z(k+1)Z^T(k+1) \quad (22)$$

$$F(k+1) = \beta^{-1}(k)F(k) - \quad (23)$$
$$\frac{\alpha(k)\beta^{-2}(k)F(k)Z(k+1)Z^T(k+1)F(k)}{1 + \alpha(k)\beta^{-1}(k)Z^T(k+1)F(k)Z(k+1)}$$

They correspond to the generalized adjustment law in the prior art, in which $$\lambda_1(k) = \beta(k) \quad (24)$$
$$\lambda_2(k) = \alpha(k) \quad (25)$$

and the formula (1) is substituted by the formula (21).

In the generalized adjustment law, the coefficients $\lambda_1(k)$ and $\lambda_2(k)$ were introduced only into the correlation function matrix, but $\lambda_2(k)$ should have been introduced into the parameter estimation formula (1).

Since the $\beta_1(k)$ in the formula (15) and $\beta_2(k)$ in the formula (16) are scalar, they are of recursive type which does not include inverse matrix calculation and suitable for real-time identification.

The fact that $\beta(k)$ in the formula (20) is scalar means that, as seen from the formula (19), a ratio of a weight $W_i(k)$ at a time step k to a weight $W_i(k+1)$ at the next step $(k+1)$ does not depend on i. This means the same rate for reducing the evaluation of significance of square of residual, as time elapses, is applied for the residual at a long past time and for the residual at a time close to present time. Namely, the data used in fitting the parameters are divided into two groups, one for present and the other for past, and they are independently weighted. Once they are weighted, the reduction of the significance is same for each time point. In an extreme case, if a weight for a certain past time point is 0, the weight to any time point other than present time point is 0, whatever it is close to the present time point.

On the other hand, the present method employing the evaluation index of the formula (10) is a least square estimation method with diagonal weighting matrix. This may be considered as a parameter estimation method of a prediction model based on an auto-regressive moving average operation. If it is assumed that $C_i(k)$ in the formula (18) is a sole function of k, a result of past control is considered only in average for all time points in the parameter fitting process and an advantage of moving average philosophy is partially lost. The adaptive control based on the prior art generalized adjustment law includes such a restriction.

An adjustment law in the adaptive control should be based on a concept of stochastic asymptotic convergence in which the more information on the control result is, the more accurate in probability is the adjustment of the parameter for enhancing the effect of the control in fixed parameter system.

The generalized adjustment law was prepared by introducing the coefficients $\lambda_1(k)$ and $\lambda_2(k)$ determining the past and present weights into the original adjustment law so that the convergence rate is increased or the law can be applied to slowly and slightly changing parameter system. There is no criterion to determine $\lambda_1(k)$ and $\lambda_2(k)$ but they are, in many cases, determined experimentarily or by experience. By the introduction of $\lambda_1(k)$ and $\lambda_2(k)$, stochastic asymptotic convergence is not generally assured.

So long as the prior art generalized adjustment law in the adaptive control is used in the scope of the object described above, the limitation in the fitting process does not adversely affect. However, in the control of general time-varying parameter system or non-linear system, only the past information near and after a time point at which the parameter changes is necessary and the information before that time point is preferably drawn away as early as possible in order to assure more effective adaptation. As one method for drawing it away, in accordance with the present invention, the fitting information is limited to that in the moving average period and the moving average period is changed in accordance with a status of change of parameter. The change of parameter is detected by observing input and output, and the status is determined in accordance with the past learning to determine an optimum moving average period.

In the method of fitting in the moving average period, $C_i(k)$ also depends on i. Thus, it cannot be realized by the prior art generalized adjustment law and it requires the expanded generalized adjustment law having the matrix coefficients in accordance with the present invention. When the adjustment law having the matrix coefficients is used, the influence of the control is divided in accordance with extent of contribution of each element of the parameter and fed back, as described before. In the moving average period method, only the extent of contribution in that period is considered. Therefore, if the period is well set, effective adaptation is attained.

Let us assume that weight $W_1(k)$ is a weighted exponential weight as shown by the following formula:

$$W_i(k) = v_i(k)\rho^{k-i} \qquad (26)$$

where
  $v_i(k)$: weight

Thus, in the formula (18), $$C_i(k) = \frac{W_i(k+1)}{W_i(k)} - 1 \qquad (27)$$

$$= \frac{v_i(k+1)}{v_i(k)} \rho - 1$$

Accordingly, when the condition of the formula (19) that $C_i(k)$ is the sole function of k is met, $$\beta(k) = (1 + C_o(k)) \qquad (28)$$

$$= \frac{v_i(k+1)}{v_i(k)} \rho \text{ (for all } i\text{)}$$

$$\alpha(k) = W_{k+1}(k+1) \qquad (29)$$

$$= v_{k+1}(k+1)$$

$$= W_{k+1}(k)(1 + C_o(k))$$

$$= v_{k+1}(k)\rho^{-1}(1 + C_o(k))$$

$$= v_{k+1}(k)\rho^{-1}\beta(k)$$

This can be considered as a variable exponentially weighted system having a base $\beta(k)$ and corresponds to the prior art generalized adjustment law system.

In the moving average period system of the present invention with the exponential weight $v_i(k)$ has the following restriction.

$$v_i(k) = 0 \text{ (for } i=1, \ldots, (k-N_k)) \qquad (30)$$

$$v_i(k) = 1/N_k \text{ (for } i=(k-N_k+1), \ldots, k) \qquad (31)$$

where
$N_k$: moving average period considered in the time step k (32)

In this case, it is clear that $C_i(k)$ depends on i, and the adjustment law with the matrix coefficients is attained.
$N_{k+1} = N_{k+1}$: variable moving average period system
$N_{k+1} = N_k$: fixed moving average period system
$N_{k+1} = N_k + 1 = k+1$: simple average system (leading to the prior art generalized adjustment law)

As described above, the formulas (12), (13) and (14) of the expanded generalized adjustment law require the calculation of inverse matrix two or more times. Since the calculation may take a long time, the system is not suitable for the real-time calculation. In the present invention, the expanded generalized adjustment law is realized in a recursive form which requires the calculation of inverse matrix only once. They are represented as follows to correspond to the formulas (12), (13) and (14).

$$\hat{\theta}(k+1) = \hat{\theta}(k) + F(k+1)Z_w(k+1)(y_w(k+1) - \quad (33)$$
$$Z_w^T(k+1)\hat{\theta}(k))$$

$$F^{-1}(k+1) \stackrel{d}{=} \sum_{i=1}^{k+1} W_i(k+1)Z(i)Z^T(i) \quad (34)$$
$$= F^{-1}(k) + Z_w(k+1)Z_w^T(k+1)$$

$$F(k+1) = F(k) - \quad (35)$$
$$F(k)Z_w(k+1)(I + Z_w^T(k+1)F(k)Z_w(k+1))^{-1}Z_w^T(k+1)F(k))$$

where $$Z_w(k+1) \stackrel{d}{=} (W_{k+1}^{\frac{1}{2}}(k+1)Z(k+1), \Delta W_k^{\frac{1}{2}}(k)Z(k), \ldots,$$
$$\Delta W_2^{\frac{1}{2}}(k)Z(2), \Delta W_1^{\frac{1}{2}}(k)Z(1))$$

$$y_w^T(k+1) \stackrel{d}{=} (W_{k+1}^{\frac{1}{2}}(k+1)y(k+1), \Delta W_k^{\frac{1}{2}}(k)y(k), \ldots,$$
$$\Delta W_2^{\frac{1}{2}}(k)y(2), \Delta W_1^{\frac{1}{2}}(k)y(1))$$

In the prior art method and the method of the present invention described above, a consideration for eliminating a steady state bias is not paid. A prior art method which can eliminate the steady state bias is an extended least square method ("Identification Method of a Linear Discrete Time System", SYSTEM AND CONTROL, Vol. 25, No. 9, pp 551–563, 1981). The present method realizes combination of the expanded generalized adjustment law with the extended least square method in a recursive form. They are represented as follows to correspond to the formulas (33), (34) and (35).

$$\hat{\theta}_e(k+1) = \hat{\theta}_e(k) + \hat{F}_e(k+1)\hat{\Omega}_w(k+1)(y_w(k+1) - \quad (36)$$
$$\hat{\Omega}_w^T(k+1)\hat{\theta}_e(k))$$

$$\hat{F}_e^{-1}(k+1) \stackrel{d}{=} \sum_{i=1}^{k+1} W_i(k+1)\hat{\omega}(i)\hat{\omega}^T(i) \quad (37)$$
$$= \hat{F}_e^{-1}(k) + \hat{\Omega}_w(k+1)\hat{\Omega}_w^T(k+1)$$

$$\hat{F}_e(k+1) = \hat{F}_e(k) - \quad (38)$$
$$\hat{F}_e(k)\hat{\Omega}_w(k+1)(I + \hat{\Omega}_w^T(k+1)\hat{F}_e(k)\hat{\Omega}_w(k+1))^{-1}\hat{\Omega}_w^T(k+1)\hat{F}_e(k)$$

where, $$\hat{\theta}_e(k+1): \text{estimation of } \theta_e \quad (39)$$

$$\Omega_w(k+1) \stackrel{d}{=} (W_{k+1}^{\frac{1}{2}}(k+1)\omega(k+1), \Delta W_k^{\frac{1}{2}}(k)\hat{\omega}(k), \ldots, \quad (40)$$
$$\Delta W_2^{\frac{1}{2}}(k)\hat{\omega}(2), \Delta W_1^{\frac{1}{2}}(k)\hat{\omega}(1))$$

$$y_w^T(k+1) \stackrel{d}{=} (W_{k+1}^{\frac{1}{2}}(k+1)y(k+1), \Delta W_k^{\frac{1}{2}}(k)y(k), \ldots, \quad (41)$$
$$\Delta W_2^{\frac{1}{2}}(k)y(2), \Delta W_1^{\frac{1}{2}}(k)y(1))$$

$$\hat{\omega}^T(k+1) \stackrel{d}{=} (y_m^T(k), U_n^T(k+1), \hat{r}_p^T(k), \hat{e}_q^T(k)): \quad (42)$$
$$\text{estimation of } \omega^T(k+1)$$

$$\hat{r}(k) \stackrel{d}{=} y(k) - y_m^T(k)\hat{a}(k) - U_n^T(k)\hat{b}(k): \text{estimation of } r(k)$$

$$\hat{e}(k) \stackrel{d}{=} \hat{r}(k) - \hat{r}_p^T(k)\hat{c}(k) - \hat{e}_q^T(k)\hat{d}(k): \text{estimation of } e(k)$$

$$\hat{e}(k+1) = y(k+1) - (Y(k+1), U(k+1), R(k+1),$$
$$E(k+1)\begin{pmatrix}a\\b\\c\\d\end{pmatrix} \stackrel{d}{=} y(k+1) - \Omega(k+1)\theta_e: \text{residual vector}$$

$Y^T(k+1) = (y_m(k), y_m(k-1), \ldots, y_m(k), y_m(0))$: matrix having process output as an element $U^T(k+1) = (U_n(k+1), U_n(k), \ldots, U_n(2), U_n(1))$: matrix having process input as an element $R^T(k+1) = (r_p(k), r_p(k-1), \ldots, r_p(1), r_p(0))$: matrix having bias of y as an element $E^T(k+1) = (e_q(k), e_q(k-1), \ldots, e_q(1), e_q(0))$: matrix having a residual after elimination of bias of y as an element $y_m^T(k+1) = (y(k+1), y(k), \ldots, y(k-m+2))$: output vector (m-order)

$U_a^T(k+1) = (u(k+1), u(k), \ldots, u(k-n+2))$: input vector (n-order)

$r_p^T(k+1) = (r(k+1), r(k), \ldots, r(k-p+2))$: bias vector of y (p-order)

$e_q^T(k+1) = (e(k+1), e(k), \ldots, e(k-q+2))$: residual vector after elimination of bias of y (q-order)

$a^T = (a_1, a_2, \ldots, a_m)$: polynomial expansion parameter vector of process input/output transfer function (denominator)

$b^T = (b_1, b_2, \ldots, b_n)$: polynomial expansion parameter vector of process input/output transfer function (numerator)

$c^T = (c_1, c_2, \ldots, c_p)$: polynomial expansion parameter vector of noise generation transfer function (denominator)

$d^T = (d_1, d_2, \ldots, d_q)$: polynomial expansion parameter vector of noise generation transfer function (numerator)

$$\Omega(k+1) \stackrel{d}{=} (Y(k+1), U(k+1), R(k+1), E(k+1)) \quad (43)$$
$$= (Z(k+1), R(k+1), E(k+1))$$
$$\stackrel{d}{=} \begin{pmatrix}\omega^T(k+1)\\ \omega^T(k)\\ \cdot\\ \cdot\\ \cdot\\ \omega^T(1)\end{pmatrix} : \text{extended matrix of } Z(k+1)$$

$$\omega^T(k+1) = (y_m^T(k), U_n^T(k+1), r_p^T(k), e_q^T(k)) \quad (44)$$
$$= (Z^T(k+1), r_p^T(k), e_q^T(k)): \text{extended matrix of } Z^T(k+1)$$

$$\theta_e^T \stackrel{d}{=} (a^T, b^T, c^T, d^T) \quad (45)$$
$$= (\theta^T, c^T, d^T): \text{extended parameter of } \theta^T$$

While a single-input, single-output system has been described above for a sake of simplicity, the present method can be expanded to a multi-input, multi-output system by employing the same method as the prior art method ("Identification Method of a Linear Discrete Time System", SYSTEM AND CONTROL, VOL. 26, No. 2, pp 84–95, 1982).

One embodiment of the present invention is now explained with reference to FIG. 1.

When the identification method of the present invention is implemented by employing a computer, it comprises, as shown in FIG. 1, a gain matrix calculation unit 1 for calculating a gain matrix in accordance with the formula (1), a parameter estimation calculation unit 2 for estimating a parameter in accordance with the formula (36), a time step updating unit 3 for recursive calculation and a weight setting unit 4 for evaluating a residual.

In FIG. 1, solid line arrows show flow of process and broken line arrows show flow of information. The operation of the present embodiment is described below.

A manipulating variable 11 generated by a controller 102 and used as an input to a process 101 and a controlled variable 12 which is an output from the process 101 are supplied to the gain matrix calculation unit 1. The gain matrix calculation unit 1 calculates a gain matrix $\hat{F}_e(k+1)$ in accordance with the formula (38) and its related formulas while using a weight 13 of the formula (11) which was previously preset in the weight setting unit 4 and the signals 11 and 12, and produces a signal 14. The signal 14 and the weight 13 are supplied to the parameter estimation calculation unit 2 which estimates the parameter $\hat{\theta}_e(k+1)$ in accordance with the formula (36) and its related formulas and produces a signal 15, which is supplied to the controller 102. The controller 102 produces a new manipulation variable 11 using the signal 15 and supplies it to the process 101. When the parameter estimation calculation unit 2 completes the calculation of the parameter estimate 15 at that time point, it waits until the time step updating unit 3 advances the time by one time step, then it passes the control of the flow of process to the gain matrix calculation unit 1, which repeats the above process.

In accordance with the present embodiment, the process parameter can be identified while the controller 102 controls the process and it can be immediately fed back to determine the manipulating variable in the controller. Accordingly, an effective adaptive control is attained.

In accordance with the present invention, the process parameter in the linear process in which the process parameter changes with time or the non-linear process can be identified in parallel with the control of the process. Accordingly, the present invention is applicable to the on-line real-time adaptive control of the process.

In the present method, since the weight of the information in each time step can be determined independently from the parameter estimation mechanism, a learning mechanism suitable for time-varying or non-linear process or an optimizing mechanism may be incorporated in the weighting mechanism.

Since the present invention is based on the expanded generalized adjustment law having the matrix coefficients, the influence of the control is divided in accordance with the extent of contribution of each element of the parameter and fed back so that more accurate identification of the parameter is attained. When the parameter fitting is effected in the moving average period, the affect by the time-varying or non-linear system can be fed back with a higher sensitivity.

We claim:

1. In a method of identification of a process parameter to minimize a sum of weighted squares of residuals defined in accordance with a relationship between process input information and process output information in a plurality of time steps from an initial time step to a current time step, the improvement comprising the step of optimally identifying the process parameter in a sense of a least square method for each corresponding time step in a recursive form based on said input information and output information when the weight of the squares changes for each time step.

2. An identification method according to claim 1, wherein said weight is expressed by a diagonal weighting matrix.

3. An identification method according to claim 2, wherein said weighting matrix has a form of an expanded generalized adjustment law in which adjustment coefficients which are two scalar coefficients in a generalized adjustment law are replaced with two matrix coefficients.

4. An identification method according to claim 3, wherein the two matrix coefficients of said expanded generalized adjustment law are determined from a weighting matrix corresponding to a method of fitting in a moving average period.

5. An identification method according to claim 3, wherein said expanded generalized adjustment law is in a recursive form.

6. An identification method according to claim 3, wherein an extended least square method eliminating steady state bias is applied to a least square method of said expanded generalized adjustment law.

* * * * *